United States Patent
Lambert

(10) Patent No.: US 11,392,168 B1
(45) Date of Patent: Jul. 19, 2022

(54) MANAGING CLOCK SYNCHRONIZATION FOR A BASEBOARD MANAGEMENT CONTROLLER (BMC) OF AN INFORMATION HANDLING SYSTEM

(71) Applicant: Dell Products L.P., Round Rock, TX (US)

(72) Inventor: Timothy M. Lambert, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/197,435

(22) Filed: Mar. 10, 2021

(51) Int. Cl.
 *G06F 1/12* (2006.01)
 *G06F 1/14* (2006.01)

(52) U.S. Cl.
 CPC . *G06F 1/14* (2013.01); *G06F 1/12* (2013.01)

(58) Field of Classification Search
 CPC ..................................... G06F 1/12; G06F 1/14
 See application file for complete search history.

(56) References Cited

U.S. PATENT DOCUMENTS

| | | | | |
|---|---|---|---|---|
| 7,197,657 B1* | 3/2007 | Tobias | ...................... | G06F 1/14 713/400 |
| 2008/0155244 A1* | 6/2008 | Shih | .......................... | G06F 1/14 713/2 |
| 2011/0314322 A1* | 12/2011 | Shao | .......................... | G06F 1/14 713/400 |
| 2012/0011402 A1* | 1/2012 | Chen | .................... | G06F 11/2284 714/25 |
| 2015/0256004 A1* | 9/2015 | Miller | .................... | H02J 7/0013 320/162 |
| 2015/0302024 A1* | 10/2015 | Li | .......................... | G06F 16/181 714/55 |
| 2017/0149925 A1* | 5/2017 | Yang | .................... | H04L 43/0817 |
| 2018/0224884 A1* | 8/2018 | Oshima | ............... | G06F 11/3089 |

* cited by examiner

*Primary Examiner* — Phil K Nguyen
(74) *Attorney, Agent, or Firm* — Baker Botts L.L.P.

(57) ABSTRACT

In one embodiment, a method for managing clock synchronization for a baseboard management controller includes identifying, by a management unit of the information handling system, a real-time clock of the information handling system based on a real-time clock time value; receiving, by the management unit, a request for the real-time clock time value from the baseboard management controller; retrieving, by the management unit, the real-time clock time value from the real-time clock; sending, by the management unit, the real-time clock time value to a logic device of the information handling system; sending, by the logic device, an interrupt signal to the baseboard management controller indicating that the real-time clock time value is stored; retrieving, by the baseboard management controller, the real-time clock time value from the logic device; and updating, by the baseboard management controller, a baseboard management controller time value based on the real-time clock time value.

20 Claims, 3 Drawing Sheets

MANAGING CLOCK SYNCHRONIZATION FOR A BASEBOARD MANAGEMENT CONTROLLER (BMC) OF AN INFORMATION HANDLING SYSTEM

BACKGROUND

Field of the Disclosure

The disclosure relates generally to information handling systems, and in particular to managing clock synchronization for a baseboard management controller (BMC) of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a method for managing clock synchronization for a baseboard management controller (BMC) of an information handling system includes: identifying, by a management unit of a processor subsystem of the information handling system, a real-time clock (RTC) of the information handling system based on an RTC time value stored in the RTC; receiving, by the management unit, a request for the RTC time value from the BMC via a first bus, the first bus communicably coupling the BMC to the management unit; retrieving, by the management unit, the RTC time value from the RTC via a second bus, the second bus communicably coupling the RTC to the management unit; sending, by the management unit, the RTC time value to a logic device of the information handling system via the second bus, the second bus communicably coupling the logic device to the management unit; storing, by the logic device, the RTC time value; and in response to storing the RTC time value: sending, by the logic device, an interrupt signal to the BMC via a third bus, the interrupt signal indicating that the RTC time value is stored, the third bus communicably coupling the BMC to the logic device; retrieving, by the BMC, the RTC time value from the logic device via the third bus; and updating, by the BMC, a BMC time value based on the RTC time value, the BMC time value stored in the BMC.

In one or more of the disclosed embodiments, identifying the RTC based on the RTC time value includes: accessing, by the management unit, a memory of the RTC via the second bus, the memory including a plurality of registers, each of the plurality of registers storing a respective portion of the RTC time value; monitoring, by the management unit, a register of the plurality of registers to identify a frequency associated with the respective portion of the RTC time value stored in the register; and determining, by the management unit, an RTC type based on the frequency associated with the respective portion of the RTC time value.

In one or more of the disclosed embodiments, monitoring the register of the plurality of registers to identify the frequency associated with the respective portion of the RTC time value includes: identifying, by the management unit, a first value of the respective portion of the RTC time value stored in the register; waiting, by the management unit, a predetermined period of time; identifying, by the management unit, a second value of the respective portion of the RTC time value stored in the register; and determining, by the management unit, a difference between the first value of the respective portion and the second value of the respective portion.

In one or more of the disclosed embodiments, the method further includes: receiving, by the management unit, a request to update the RTC time value from a host service of the information handling system, the request based on a change event associated with the information handling system; identifying, by the management unit, an updated RTC time value based on the request; sending, by the management unit, the updated RTC time value to the logic device via the second bus; storing, by the logic device, the updated RTC time value; and in response to storing the updated RTC time value: sending, by the logic device, an additional interrupt signal to the BMC via the third bus, the additional interrupt signal indicating that the updated RTC time value is stored; retrieving, by the BMC, the updated RTC time value from the logic device via the third bus; and updating, by the BMC, the BMC time value based on the updated RTC time value.

In one or more of the disclosed embodiments, the method further includes sending, by the management unit, the updated RTC time value to the RTC via the second bus.

In one or more of the disclosed embodiments, the method further includes causing the BMC to reboot; identifying, by the BMC, that the management unit is powered off; and retrieving, by the BMC, the RTC time value from the logic device via the third bus.

In one or more of the disclosed embodiments, the method further includes identifying a time drift associated with the BMC time value, the time drift comprising a difference between the BMC time value and the RTC time value; and causing the BMC to reboot.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
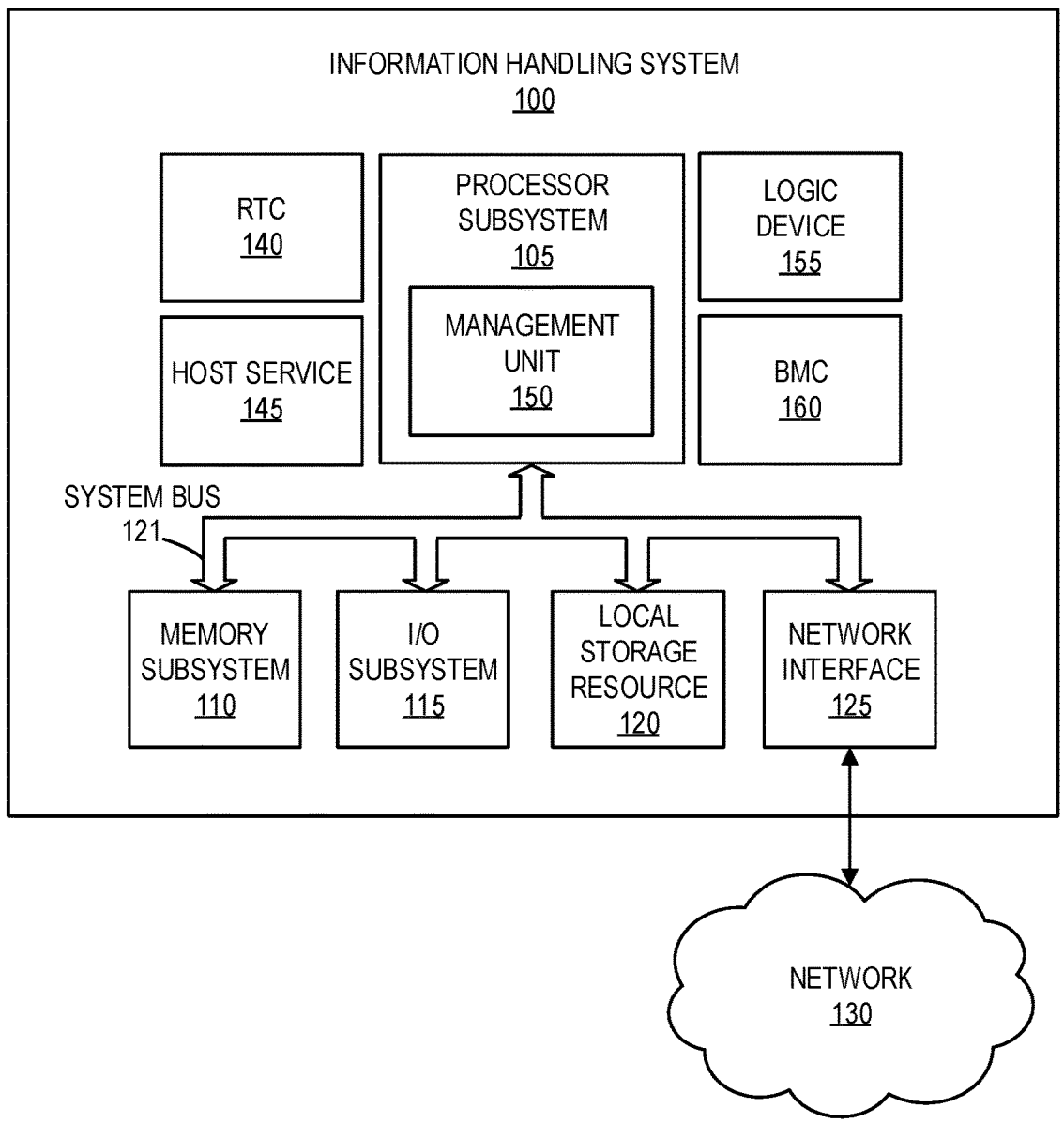
FIG. 1 is a block diagram of selected elements of an embodiment of a computing environment that includes an information handling system.

This document describes a method for managing clock synchronization for a baseboard management controller (BMC) of an information handling system that includes: identifying, by a management unit of a processor subsystem of the information handling system, a real-time clock (RTC) of the information handling system based on an RTC time value stored in the RTC; receiving, by the management unit, a request for the RTC time value from the BMC via a first bus, the first bus communicably coupling the BMC to the management unit; retrieving, by the management unit, the RTC time value from the RTC via a second bus, the second bus communicably coupling the RTC to the management unit; sending, by the management unit, the RTC time value to a logic device of the information handling system via the second bus, the second bus communicably coupling the logic device to the management unit; storing, by the logic device, the RTC time value; and in response to storing the RTC time value: sending, by the logic device, an interrupt signal to the BMC via a third bus, the interrupt signal indicating that the RTC time value is stored, the third bus communicably coupling the BMC to the logic device; retrieving, by the BMC, the RTC time value from the logic device via the third bus; and updating, by the BMC, a BMC time value based on the RTC time value, the BMC time value stored in the BMC.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
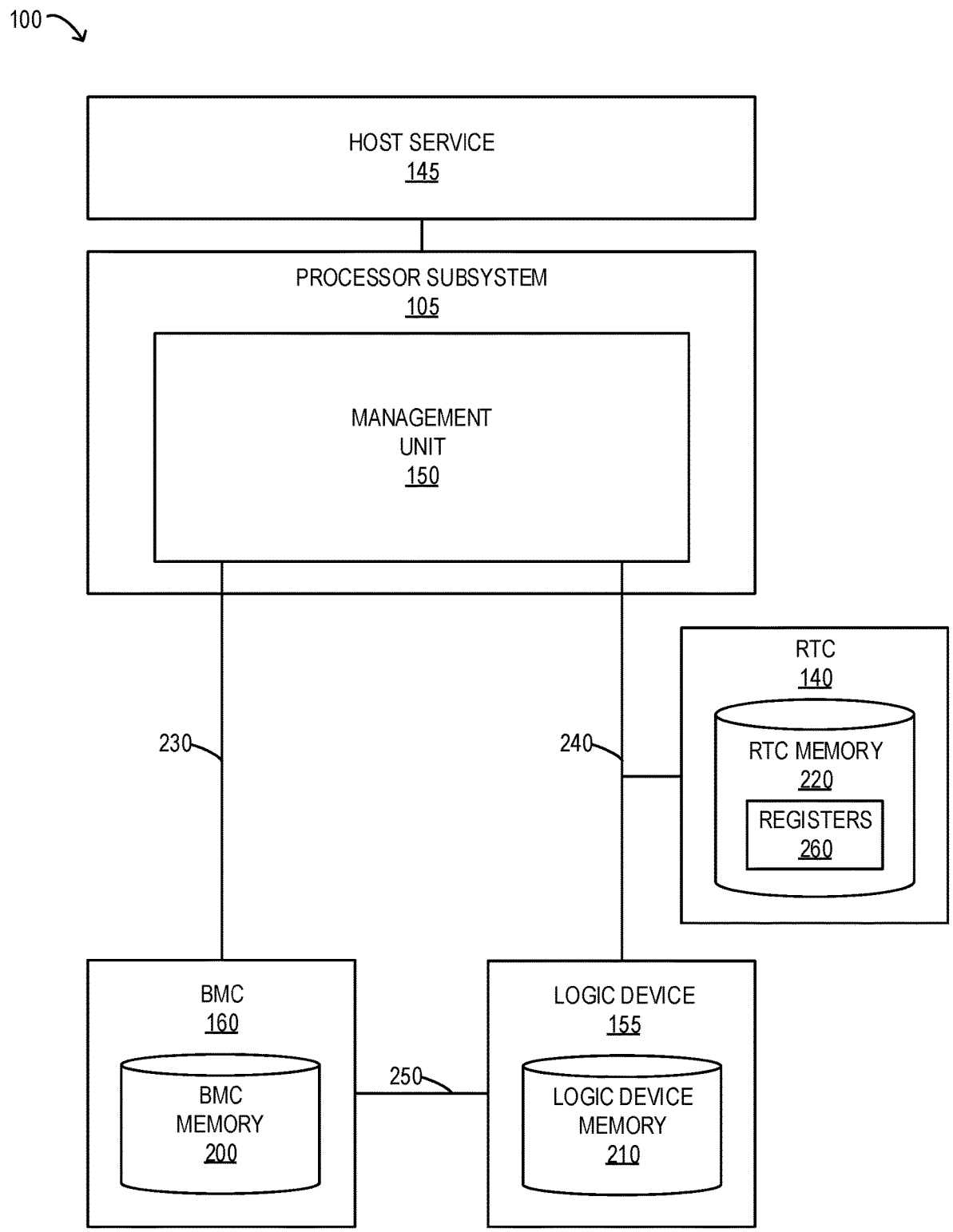
FIG. 2 is a block diagram of selected elements of an embodiment of an information handling system that includes a baseboard management controller (BMC) and multiple buses.
Figure 3:
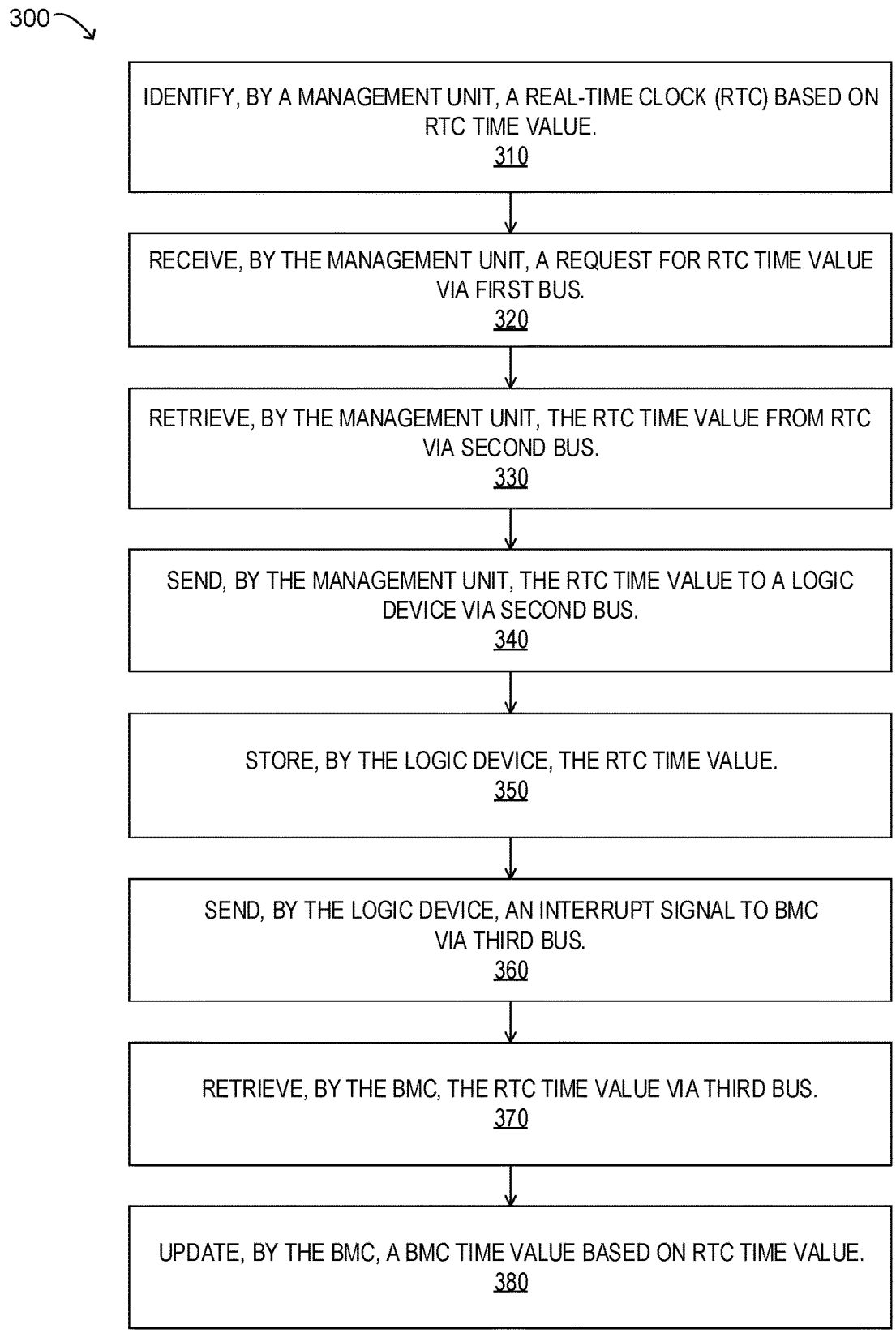
FIG. 3 is a flowchart depicting selected elements of an embodiment of a method for managing clock synchronization for a BMC of an information handling system.

Particular embodiments are best understood by reference to FIGS. 1-3 wherein like numbers are used to indicate like and corresponding parts.

Turning now to the drawings, FIG. 1 is a block diagram of selected elements of an embodiment of a computing environment that includes an information handling system. Specifically, FIG. 1 illustrates a block diagram depicting selected elements of an information handling system 100 in accordance with some embodiments of the present disclosure. In other embodiments, information handling system 100 may represent different types of portable information handling systems, such as, display devices, head mounted displays, head mount display systems, smart phones, tablet computers, notebook computers, media players, foldable display systems, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems.

In the embodiment illustrated in FIG. 1, components of information handling system 100 may include, but are not limited to, a processor subsystem 105, which may comprise one or more processors, and system bus 121 that communicatively couples various system components to processor subsystem 105 including, for example, a memory subsystem 110, an I/O subsystem 115, a local storage resource 120, and a network interface 125. Processor subsystem 105 may include a management unit 150. System bus 121 may represent a variety of suitable types of bus structures (e.g., a memory bus, a peripheral bus, or a local bus) using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. As shown in FIG. 1, information handling system 100 may additionally include a real-time clock (RTC) 140, a host service 145, a logic device 155, and a baseboard management controller (BMC) 160.

In information handling system 100, processor subsystem 105 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 105 may interpret and/or execute program instructions and/or process data stored locally (e.g., in memory subsystem 110 and/or another component of information handling system 100). In the same or alternative embodiments, processor subsystem 105 may interpret and/or execute program instructions and/or process data stored remotely. In one embodiment, processor subsystem 105 may be or include a multi-core processor comprised of one or more central processing units (CPUs) disposed upon an integrated circuit (IC) chip. In other embodiments, processor subsystem 105 may be or include an integrated device (e.g., microcontroller, system on a chip (SoC), and the like) that includes memory, peripheral interfaces, and/or other components suitable for interpreting and/or executing program instructions and/or processing data. In the embodiment illustrated in FIG. 1, processor subsystem 105 includes a management unit 150 operable to manage clock synchronization for BMC 160. Processor subsystem 105 is described in further detail with respect to FIG. 2.

In one embodiment, memory subsystem 110 may comprise a system, device, or apparatus operable to retain and/or retrieve program instructions and/or data for a period of time (e.g., computer-readable media). Memory subsystem 110 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In one embodiment, I/O subsystem 115 may comprise a system, device, or apparatus generally operable to receive and/or transmit data to/from/within information handling system 100. I/O subsystem 115 may represent, for example, a variety of communication interfaces, graphics interfaces, video interfaces, user input interfaces, and/or peripheral interfaces. In various embodiments, I/O subsystem 115 may be used to support various peripheral devices, such as a touch panel, a display adapter, a keyboard, an accelerometer, a touch pad, a gyroscope, an IR sensor, a microphone, a sensor, or a camera, or another type of peripheral device.

In one embodiment, local storage resource 120 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In one embodiment, network interface 125 may be a suitable system, apparatus, or device operable to serve as an interface between information handling system 100 and a network 130. Network interface 125 may enable information handling system 100 to communicate over network 130 using a suitable transmission protocol and/or standard, including, but not limited to, transmission protocols and/or standards enumerated below with respect to the discussion of network 130. Network 130 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 125 may enable wired and/or wireless communications (e.g., NFC or Bluetooth) to and/or from information handling system 100.

In particular embodiments, network 130 may include one or more routers for routing data between client information handling systems 100 and server information handling systems 100. A device (e.g., a client information handling system 100 or a server information handling system 100) on network 130 may be addressed by a corresponding network address including, for example, an Internet protocol (IP) address, an Internet name, a Windows Internet name service (WINS) name, a domain name or other system name. In particular embodiments, network 130 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

In one embodiment, network 130 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 130 and its various components may be implemented using hardware, software, or any combination thereof.

In one embodiment, RTC 140 may be a suitable system, apparatus, or device operable to electronically measure a passage of time. In particular, RTC 140 may be or include an electronic hardware device that includes an internal clock operable to generate and maintain a digital temporal record used to track a progression of time for information handling system 100, or an "RTC time value." In one embodiment, RTC 140 may include a stand-alone power supply (e.g., lithium battery, supercapacitor, and the like), an electronic oscillator circuit (e.g., a crystal oscillator), and an internal memory such that RTC 140 may increment the RTC time value without receiving power from a power source, or power sources, of information handling system 100. RTC 140 may increment the RTC time value by counting the cycles of the electronic oscillator circuit. In one embodiment, RTC 140 may be or include an integrated circuit (IC) communicably coupled to processor subsystem 105 via one or more busses of information handling system 100.

In one embodiment, respective units of time comprising an RTC time value (e.g., milliseconds, seconds, minutes, hours, and the like) stored in the internal memory of RTC 140 may each be stored individually with respect to one another. Specifically, the internal memory of RTC 140 (e.g., RTC memory 220 shown in FIG. 2) may include registers (e.g., registers 260 shown in FIG. 2) that each store a respective unit of an RTC time value. Each register may be addressed, or otherwise represented, by a register number such that respective units of an RTC time value may be monitored, updated, or otherwise accessed by management unit 150. For example, millisecond units of an RTC time value may be stored in a register "00" within the internal memory of RTC 140, second units of the RTC time value may be stored in register "01," and minute units of the RTC time value may be stored in register "02" such that management unit 150 may access each respective unit of time comprising the RTC time value based on respective register numbers. RTC 140 is described in further detail with respect to FIG. 2.

In one embodiment, host service 145 may be a suitable system, apparatus, or device operable to manage resources for information handling system 100. In particular, host service 145 may be or include a set of instructions electronically stored within information handling system 100 (e.g., stored in local storage resource 120) that allows information handling system 100 to manage various resources and/or perform specific tasks. In one embodiment, host service 145 may be or include system software used by information handling system 100 to manage resources. For example, host service 145 may be or include an operating system (OS) used by information handling system 100 to manage memory allocation, schedule tasks, and/or provide services for applications executing on information handling system 100. In another embodiment, host service 145 may be or include system firmware used by information handling system 100 to perform specific tasks. For example, host service 145 may be or include Basic Input/Output System (BIOS) firmware used by information handling system 100 to perform hardware initialization during a booting process and/or to provide runtime services for other host services executing on information handling system 100. Host service 145 is described in further detail with respect to FIG. 2.

In one embodiment, BMC 160 may be a suitable system, apparatus, or device operable to monitor a physical state of information handling system 100. In particular, BMC 160 may be or include an electronic hardware device that includes one or more sensors used to monitor physical parameters of information handling system 100 (e.g., power supply voltage, fan speed, humidity, temperature, and the like). In one embodiment, BMC 160 may additionally include circuitry (e.g., processor, memory, network interface, and the like) that allows BMC 160 to communicate with one or more additional information handling systems and/or an administrator, or administrators, of computing environment 135. For example, BMC 160 may notify an administrator of computing environment 135 of events in which physical parameters of information handling system 100 are above or below permissible limits. In this example, BMC 160 may additionally log such events for error analysis.

To log events, BMC 160 may include an internal clock operable to generate and maintain a digital temporal record used to track a progression of time for BMC 160, or a "BMC time value." In one embodiment, a BMC time value generated and/or maintained by BMC 160 may be unsynchronized with an RTC time value generated and/or maintained by RTC 140. For example, BMC 160 may reboot and, in response to rebooting, generate an initial BMC time value at compile time that is unsynchronized with an RTC time value. In another example, a difference between a BMC time value and an RTC time value, or a "time drift," may cause the BMC time value to be unsynchronized with the RTC time value, occurring gradually over time and/or in response to a change event. In one embodiment, BMC 160 may request to synchronize the BMC time value with an RTC time value generated by RTC 140 such that events logged by BMC 160 (i.e., events occurring in the BMC domain) may share a common time value with events logged by information handling system 100 (i.e., events occurring in the host domain). In one embodiment, BMC 160 may be or include a microcontroller. For example, BMC 160 may be or include an 8051 microcontroller, an ARM Cortex-M (e.g., Cortex-M0, Cortex-M1, Cortex-M3, Cortex-M4, Cortex-M7, and the like) microcontroller, a MSP430 microcontroller, an AVR (e.g., 8-bit AVR, AVR-32, and the like) microcontroller, a PIC microcontroller, a 68HC11 microcontroller, a ColdFire microcontroller, a Renesas microcontroller, etc. In other embodiments, BMC 160 may be or include an application processor, a field programmable gate array (FPGA), ASIC, and/or any integrated circuit suitable for monitoring a physical state of information handling system 100.

In one embodiment, management unit 150 may be a suitable system, apparatus, or device operable to manage clock synchronization for information handling system 100. In particular, management unit 150 may be or include an electronic hardware device that includes circuitry operable to manage clock synchronization for BMC 160 such that a BMC time value may be updated based on an RTC time value. Conventionally, a processor subsystem of an information handling system may maintain exclusive access to an RTC of the information handling system, thereby restricting a BMC of the information handling system from directly accessing the RTC to update a BMC time value. Therefore, the BMC may send an interrupt (e.g., a Systems Management Interrupt) to the conventional processor subsystem requesting an RTC time value from the RTC. In response to receiving the interrupt, the conventional processor subsystem may first identify the RTC using an RTC identifier (e.g., RTC part number, RTC vendor, and the like) indicating an RTC model, or an "RTC type." For example, the RTC identifier may be hardcoded into the software/firmware framework comprising a host service (e.g., in an XML file) such that the conventional processor subsystem may identify a register set associated with an RTC. Determining the RTC type allows the conventional processor subsystem to identify the register, or registers, within an RTC memory of the RTC where respective units of time comprising the RTC time value are stored. However, hardcoding the RTC identifier into the software/firmware framework comprising the host service in this conventional manner may impose a significant limit on the quantity and/or types of RTCs that may be installed on, or otherwise available to, the information handling system.

Once the RTC type has been identified, the conventional processor subsystem may service the interrupt by retrieving the RTC time value from the RTC and sending the RTC time value to the BMC. However, servicing the interrupt in this conventional manner may cause one or more CPUs of the conventional processor subsystem to temporarily halt servicing current tasks and to instead retrieve and send the RTC time value, thereby increasing latency in processing tasks and decreasing overall system performance and user experience. Further, the BMC may require a current RTC time value for each instance in which the BMC reboots or experiences a time drift, thus requiring additional interrupts to be sent to the conventional processor subsystem causing further latency. In addition, for instances in which the BMC reboots and the conventional processor subsystem is offline (e.g., the information handling system is in an "S5" auxiliary state), or otherwise unavailable, the additional interrupts may not be serviced at all, causing the BMC to timestamp one or more events using an inaccurate BMC time value. Lastly, the conventional processor subsystem may fail to notify the BMC of change events (e.g., changes in time due to daylight savings time, time zones, and the like) that update, or otherwise modify, the RTC time value stored in RTC, thereby causing the BMC time value generated and/or maintained by the BMC to be further unsynchronized with the updated RTC time value.

In contrast, management unit 150 may manage clock synchronization for BMC 160 on behalf of processor subsystem 105, such that a BMC time value generated and/or maintained by BMC 160 may be updated based on an RTC time value generated and/or maintained by RTC 140. In particular, management unit 150 may identify an RTC type of RTC 140 based on the RTC time value (e.g., stored in RTC memory 220 shown in FIG. 2) of RTC 140. That is, management unit 150 may identify an RTC type of RTC 140 without requiring an RTC identifier to be hardcoded into the software/firmware framework comprising host service 145, thereby supporting an architecture in which various quantities and/or types of RTCs may be installed on, or otherwise available to, information handling system 100. Once the RTC type has been identified, management unit 150 may receive a request for an RTC time value from BMC 160, retrieve the RTC time value from RTC 140, and send the RTC time value to logic device 155 of information handling system 100 for storage. Logic device 155 may store the RTC time value (e.g., in logic device memory 210 shown in FIG. 2) and may send an interrupt signal to BMC 160 indicating that the RTC time value has been stored. In response, BMC 160 may retrieve the RTC time value from logic device 155 and update the BMC time value (e.g., stored in BMC memory 200 shown in FIG. 2) based on the RTC time value, thereby synchronizing the BMC time value with the RTC time value.

Thus, management unit 150 may manage clock synchronization for BMC 160 without requiring processor subsystem 105 to service multiple interrupts sent from BMC 160 in response to BMC 160 rebooting or experiencing time drift, thereby decreasing latency in processing tasks and increasing overall system performance and user experience. Further, management unit 150 may notify BMC 160 of change events that update, or otherwise modify, the RTC time value stored in RTC 140, thereby supporting BMC time value synchronization despite changes made to the RTC time value. In one embodiment, BMC 160 may be or include a microcontroller. For example, BMC 160 may be or include an 8051 microcontroller, an ARM Cortex-M (e.g., Cortex-M0, Cortex-M1, Cortex-M3, Cortex-M4, Cortex-M7, and the like) microcontroller, a MSP430 microcontroller, an AVR (e.g., 8-bit AVR, AVR-32, and the like) microcontroller, a PIC microcontroller, a 68HC11 microcontroller, a ColdFire microcontroller, a Renesas microcontroller, etc. In other embodiments, BMC 160 may be or include an application processor, a field programmable gate array (FPGA), ASIC, and/or any integrated circuit suitable for managing clock synchronization for BMC 160. Management unit 150 is described in further detail with respect to FIG. 2.

In one embodiment, logic device 155 may be a suitable system, apparatus, or device operable to electronically store an RTC time value. In particular, logic device 155 may be or include an electronic hardware device operable to store an RTC time value sent from management unit 150 such that the RTC time value may be retrieved by BMC 160 to update a BMC time value as described above. In one embodiment, logic device 155 may be or include a programmable logic device. For example, logic device 155 may be or include a complex programmable logic device (CPLD) comprised of logic arrays and macrocells operable to perform one or more logic operations. In another embodiment, logic device 155 may be or include a microcontroller. For example, logic device 155 may be or include an 8051 microcontroller, an ARM Cortex-M (e.g., Cortex-M0, Cortex-M1, Cortex-M3, Cortex-M4, Cortex-M7, and the like) microcontroller, a MSP430 microcontroller, an AVR (e.g., 8-bit AVR, AVR-32, and the like) microcontroller, a PIC microcontroller, a 68HC11 microcontroller, a ColdFire microcontroller, a Renesas microcontroller, etc. In other embodiments, logic device 155 may be or include an application processor, a field programmable gate array (FPGA), ASIC, and/or any integrated circuit suitable for electronically storing an RTC time value. Logic device 155 is described in further detail with respect to FIG. 2.

FIG. 2 is a block diagram of selected elements of an embodiment of an information handling system that includes a baseboard management controller (BMC) and multiple buses. In the embodiment illustrated in FIG. 2, BMC 160 is communicably coupled to management unit 150 via a first bus (i.e., bus 230) of information handling system 100. For example, bus 230 may be or include an enhanced serial peripheral interface (eSPI) communicably coupling BMC 160 to management unit 150 such that BMC 160 may send a request for an RTC time value to management unit 150. Similarly, management unit 150 is communicably coupled to, both, RTC 140 and logic device 155 via a second bus (i.e., bus 240) of information handling system 100. For example, bus 240 may be or include an inter-integrated circuit (I2C) communicably coupling management unit 150 to, both, RTC 140 and logic device 155 such that management unit 150 may retrieve an RTC time value from RTC 140 and may send the RTC time value to logic device 155 for storage. In addition, logic device 155 is communicably coupled to BMC 160 via a third bus (i.e., bus 250) of information handling system 100. For example, bus 250 may be or include a serial peripheral interface (SPI) communicably coupling logic device 155 to BMC 160 such that logic device 155 may send an interrupt signal to BMC 160 via bus 250. BMC 160 may additionally retrieve an RTC time value from logic device 155 via bus 250. It is noted that although busses 230, 240, and 250 are illustrated in FIG. 2, other embodiments of information handling system 100 may include additional, fewer, and/or any combination of busses suitable for managing clock synchronization for BMC 160.

In one embodiment, management unit 150 may identify an RTC installed on, or otherwise available to, information handling system 100. Specifically, management unit 150 may identify an RTC type of RTC 140 based on an RTC time value stored in RTC memory 220. In the embodiment illustrated in FIG. 2, management unit 150 may access RTC memory 220 via bus 240. As described above with respect to FIG. 1, respective units of time comprising an RTC time value (e.g., milliseconds, seconds, minutes, hours, and the like) stored in RTC memory 220 may each be stored individually with respect to one another. In particular, RTC memory 220 may include registers 260 (individually referred to herein as "register 260") that each store a respective unit of an RTC time value. Each register 260 may be addressed, or otherwise represented, by a register number such that respective units of an RTC time value may be monitored, updated, or otherwise accessed by management unit 150 via bus 240. For example, millisecond units of an RTC time value may be stored in a register 260 of RTC memory 220 having an address of "00." In this example, management unit 150 may access the register 260 having an address of "00" to monitor millisecond units of the RTC time value. In one embodiment, management unit 150 may monitor a register 260 of RTC memory 220 to identify a frequency associated with a respective portion of the RTC time value stored in the register 260. Management unit 150 may then determine an RTC type based on the frequency associated with the respective portion of the RTC time value.

To identify a frequency associated with a respective portion of an RTC time value stored in a register 260 of RTC memory 220, management unit 150 may identify a first value of the respective portion of the RTC time value stored in the register 260. In the example described above, the first value of the millisecond units of the RTC time value may be "002," indicating that the RTC time value includes a first value of two milliseconds. Next, management unit 150 may wait for a predetermined period of time (e.g., 50 milliseconds), allowing the first value to increase as time elapses. In one embodiment, the period of time in which management unit 150 waits may be predetermined by an administrator of information handling system 100. In another embodiment, the period of time may be predetermined by a manufacturer of information handling system 100. In yet another embodiment, the period of time may be predetermined by a backend management system and/or microservice of computing environment 135 (not shown in figure). Upon waiting for the predetermined period of time, management unit 150 may identify a second value of the respective portion of the RTC time value stored in the register 260. For example, the second value of the millisecond units of the RTC time value may be "052," indicating that the RTC time value includes a second value of 52 milliseconds. Management unit 150 may then determine a difference between the first value of the respective portion and the second value of the respective portion to identify the frequency associated with the respective portion. In the example described above, management unit 150 may determine that the difference between the first value and the second value is a difference of 50 milliseconds. Given that this difference matches, or otherwise corresponds to, the predetermined period of time in which the management unit 150 waited between identifying the first and second values of the respective portion of the RTC time value (without roll-over), management unit 150 may determine that the register 260 is used to store millisecond units of the RTC time value. Management unit 150 may then determine an RTC type based on the frequency associated with the respective portion of the RTC time value. In one embodiment, management unit 150 may identify an RTC installed on, or otherwise available to, information handling system 100 by accessing an RTC identifier (e.g., RTC part number, RTC vendor, and the like) stored in information handling system 100. For example, management unit 150 may access an RTC identifier stored at a predefined address in logic device memory 210 of logic device 155 to identify an RTC type for RTC 140.

Once the RTC type has been identified, management unit 150 may retrieve the RTC time value from RTC memory 220 of RTC 140 and send the RTC time value to logic device 155 of information handling system 100 for storage. In particular, management unit 150 may receive a request for the RTC time value (e.g., stored in RTC memory 220) from BMC 160 via bus 230. For example, BMC 160 may reboot and, in response to rebooting, generate an initial BMC time value at compile time that is unsynchronized with an RTC time value. Because BMC 160 may require using the BMC time value (e.g., stored in BMC memory 200) to timestamp one or more events during boot time, BMC 160 may send a request for an RTC time value to management unit 150 to update the BMC time value based on the RTC time value, thereby synchronizing the BMC time value with the RTC time value. In another example, an administrator of information handling system 100 may identify a time drift associated with the BMC time value and may cause BMC 160 to reboot. Upon rebooting, BMC 160 may send the request for an RTC time value to management unit 150 to update the BMC time value accordingly. In response to receiving the request for the RTC time value from BMC 160 via bus 230, management unit 150 may retrieve the RTC time value from RTC memory 220 (i.e., from registers 260 therein) via bus 240 and may send the RTC time value to logic device 155 to be stored in logic device memory 210. For example, management unit 150 may execute a read command from the register 260, or registers 260, within RTC memory 220 in which the RTC time value is stored and may execute a write command to one or more addresses within logic device memory 210 designated to receive and store the RTC time value. Logic device 155 may store the RTC time value accordingly. By sending the RTC time value directly to logic device 155 rather than allowing logic device 155 to retrieve the RTC time value from the RTC 140, management unit 150 ensures that potential collisions on bus 240 may be avoided. Specifically, management unit 150 may ensure that RTC time value data sent via bus 240 does not collide with data sent to/from host service 145 via bus 240. In this way, management unit 150 may orchestrate bus activity on behalf of host service 145, thereby supporting host service 145 stability.

Once the RTC time value has been stored in logic device 155 (e.g., stored in logic device memory 210), BMC 160 may synchronize the BMC time value (e.g., stored in BMC memory 200) with the RTC time value. In particular, logic device 155 may send an interrupt signal to BMC 160 via bus 250 indicating that the RTC time value is stored and is available to be retrieved. BMC 160 may receive the interrupt signal from logic device 155 and, in response, retrieve the RTC time value from logic device memory 210 via bus 250. In one embodiment, the RTC time value stored in logic device memory 210 may remain stored in logic device memory 210 after being retrieved by BMC 160. That is, a static RTC time value (i.e., representing an instance in the passage of time electronically measured by RTC 140) may remain stored in logic device memory 210 without incrementing as time elapses. In another embodiment, BMC 160 may delete, or otherwise remove, the RTC time value stored in logic device memory 210 after the RTC time value is retrieved. BMC 160 may then update the BMC time value based on the RTC time value, thus completing the synchronization process.

In one embodiment, BMC 160 may retrieve an RTC time value from logic device 155 without sending a request for the RTC time value to management unit 150. Specifically, BMC 160 may retrieve the RTC time value from logic device memory 210 via bus 250 without sending a request for the RTC time value to management unit 150 via bus 230. For example, BMC 160 may reboot, or may be caused to reboot due to a time drift, and may generate an initial BMC time value at compile time that is unsynchronized with an RTC time value as described above. However, upon reboot, BMC 160 may identify that management unit 150 is powered off or is otherwise unavailable to service the request for the RTC time value. For example, processor subsystem 105, host service 145, and/or management unit 150 may be powered off following a global reset, thereby restricting communication between BMC 160 and management unit 150 and/or processor subsystem 105 via bus 230. Here, rather than sending a request for the RTC time value to management unit 150 via bus 230, BMC 160 may refrain from sending the request and instead simply retrieve the RTC time value previously stored in logic device memory 210. In this way, BMC 160 may update the BMC time value with the most recent RTC time value stored in logic device memory 210 for logging events without requiring management unit 150 to retrieve and send the current RTC time value from RTC 140.

In one embodiment, management unit 150 may notify BMC 160 of change events that update, or otherwise modify, the RTC time value stored in RTC 140. Specifically, management unit 150 may receive a request to update the RTC time value from host service 145. For example, management unit 150 may identify a write command initiated by host service 145 to RTC 140 that specifies an updated RTC time value to be stored in RTC memory 220. In one embodiment, the request to update the RTC time value may be based on a change event associated with information handling system 100. For example, a user of information handling system 100 may access an operating system (OS) (i.e., a host service 145) to update the RTC time value in accordance with the start of daylight savings time. In another embodiment, a user of information handling system 100 may access Basic Input/Output System (BIOS) firmware (i.e., a host service 145) to update the RTC time value in accordance with a change in time zone. In one embodiment, management unit 150 may identify the updated RTC time value based on the request to update the RTC time value from host service 145, store the updated RTC time value in RTC 140 (e.g., in RTC memory 220) via bus 240, and may send the updated RTC time value to logic device 155 via bus 240 for storage. For example, management unit 150 may convert the request to update the RTC time value into an I2C command and may send the I2C command to, both, RTC 140 and logic device 155 via bus 240.

FIG. 3 is a flowchart depicting selected elements of an embodiment of a method for managing clock synchronization for a baseboard management controller (BMC) of an information handling system. It is noted that certain operations described in method 300 may be optional or may be rearranged in different embodiments.

Method 300 may begin at step 310, where a management unit of a processor subsystem of the information handling system may identify a real-time clock (RTC) of the information handling system based on an RTC time value stored in the RTC. For example, management unit 150 may monitor a register 260 of RTC memory 220 to identify a frequency associated with a respective portion of the RTC time value stored in the register 260 and may then determine an RTC type based on the frequency associated with the respective portion of the RTC time value as described above with respect to FIG. 2. In step 320, the management unit may receive a request for the RTC time value from the BMC via a first bus communicably coupling the BMC to the management unit. For example, management unit 150 may receive a request for the RTC time value from BMC 160 via bus 230 as described above with respect to FIG. 2. In step 330, the management unit may retrieve the RTC time value from the RTC via a second bus communicably coupling the RTC to the management unit. For example, management unit 150 may retrieve the RTC time value from RTC 140 via bus 240 as described above with respect to FIG. 2. In step 340, the management unit may send the RTC time value to a logic device of the information handling system via the second bus communicably coupling the logic device to the management unit. For example, management unit 150 may send the RTC time value to logic device 155 via bus 240 as described above with respect to FIG. 2. In step 350, the logic device may store the RTC time value received from the management unit. For example, logic device 155 may store the RTC time value received from management unit 150 in logic device memory 210. In step 360, the logic device may send an interrupt signal to the BMC via a third bus communicably coupling the BMC to the logic device. The interrupt signal may indicate that the RTC time value is stored in the logic device. For example, logic device 155 may send an interrupt signal to BMC 160 via bus 250 indicating that the RTC time value is stored and is available to be retrieved as described above with respect to FIG. 2. In step 370, the BMC may retrieve the RTC time value from the logic device via the third bus. For example, BMC 160 may receive the interrupt signal from logic device 155 and, in response, retrieve the RTC time value from logic device memory 210 via bus 250 as described above with respect to FIG. 2. In step 380, the BMC may update a BMC time value stored in the BMC based on the RTC time value. For example, BMC 160 may update the BMC time value stored in BMC memory 200 based on the RTC time value, thereby synchronizing the BMC time value with the RTC time value as described above with respect to FIG. 2.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for managing clock synchronization for a baseboard management controller (BMC) of an information handling system, the method comprising:

identifying, by a management unit of a processor subsystem of the information handling system, a real-time clock (RTC) of the information handling system based on an RTC time value stored in the RTC;

receiving, by the management unit, a request for the RTC time value from the BMC via a first bus, the first bus communicably coupling the BMC to the management unit;

retrieving, by the management unit, the RTC time value from the RTC via a second bus, the second bus communicably coupling the RTC to the management unit;

sending, by the management unit, the RTC time value to a logic device of the information handling system via the second bus, the second bus communicably coupling the logic device to the management unit;

storing, by the logic device, the RTC time value; and in response to storing the RTC time value:
    sending, by the logic device, an interrupt signal to the BMC via a third bus, the interrupt signal indicating that the RTC time value is stored, the third bus communicably coupling the BMC to the logic device;
    retrieving, by the BMC, the RTC time value from the logic device via the third bus; and
    updating, by the BMC, a BMC time value based on the RTC time value, the BMC time value stored in the BMC.

2. The method of claim 1, wherein identifying the RTC based on the RTC time value comprises:

accessing, by the management unit, a memory of the RTC via the second bus, the memory including a plurality of registers, each of the plurality of registers storing a respective portion of the RTC time value;

monitoring, by the management unit, a register of the plurality of registers to identify a frequency associated with the respective portion of the RTC time value stored in the register; and determining, by the management unit, an RTC type based on the frequency associated with the respective portion of the RTC time value.

3. The method of claim 2, wherein monitoring the register of the plurality of registers to identify the frequency associated with the respective portion of the RTC time value comprises:

identifying, by the management unit, a first value of the respective portion of the RTC time value stored in the register;

waiting, by the management unit, a predetermined period of time;

identifying, by the management unit, a second value of the respective portion of the RTC time value stored in the register; and determining, by the management unit, a difference between the first value of the respective portion and the second value of the respective portion.

4. The method of claim 1, further comprising:

receiving, by the management unit, a request to update the RTC time value from a host service of the information handling system, the request based on a change event associated with the information handling system;

identifying, by the management unit, an updated RTC time value based on the request;

sending, by the management unit, the updated RTC time value to the logic device via the second bus;

storing, by the logic device, the updated RTC time value; and in response to storing the updated RTC time value:
    sending, by the logic device, an additional interrupt signal to the BMC via the third bus, the additional interrupt signal indicating that the updated RTC time value is stored;
    retrieving, by the BMC, the updated RTC time value from the logic device via the third bus; and
    updating, by the BMC, the BMC time value based on the updated RTC time value.

5. The method of claim 4, further comprising:

sending, by the management unit, the updated RTC time value to the RTC via the second bus.

6. The method of claim 1, further comprising:

causing the BMC to reboot;

identifying, by the BMC, that the management unit is powered off; and retrieving, by the BMC, the RTC time value from the logic device via the third bus.

7. The method of claim 1, further comprising:

identifying a time drift associated with the BMC time value, the time drift comprising a difference between the BMC time value and the RTC time value; and causing the BMC to reboot.

8. One or more computer-readable non-transitory storage media embodying software that is operable when executed to:

identify, by a management unit of a processor subsystem of an information handling system, a real-time clock (RTC) of the information handling system based on an RTC time value stored in the RTC;

receive, by the management unit, a request for the RTC time value from a baseboard management controller (BMC) of the information handling system via a first bus, the first bus communicably coupling the BMC to the management unit;

retrieve, by the management unit, the RTC time value from the RTC via a second bus, the second bus communicably coupling the RTC to the management unit;

send, by the management unit, the RTC time value to a logic device of the information handling system via the second bus, the second bus communicably coupling the logic device to the management unit;

store, by the logic device, the RTC time value; and in response to storing the RTC time value:
    send, by the logic device, an interrupt signal to the BMC via a third bus, the interrupt signal indicating that the RTC time value is stored, the third bus communicably coupling the BMC to the logic device;
    retrieve, by the BMC, the RTC time value from the logic device via the third bus; and
    update, by the BMC, a BMC time value based on the RTC time value, the BMC time value stored in the BMC.

9. The media of claim 8, wherein to identify the RTC based on the RTC time value, the software is further operable when executed to:

access, by the management unit, a memory of the RTC via the second bus, the memory including a plurality of registers, each of the plurality of registers storing a respective portion of the RTC time value;

monitor, by the management unit, a register of the plurality of registers to identify a frequency associated with the respective portion of the RTC time value stored in the register; and determine, by the management unit, an RTC type based on the frequency associated with the respective portion of the RTC time value.

10. The media of claim 9, wherein to monitor the register of the plurality of registers to identify the frequency associated with the respective portion of the RTC time value, the software is further operable when executed to:

identify, by the management unit, a first value of the respective portion of the RTC time value stored in the register;

wait, by the management unit, a predetermined period of time;

identify, by the management unit, a second value of the respective portion of the RTC time value stored in the register; and determine, by the management unit, a difference between the first value of the respective portion and the second value of the respective portion.

11. The media of claim 8, wherein the software is further operable when executed to:

receive, by the management unit, a request to update the RTC time value from a host service of the information handling system, the request based on a change event associated with the information handling system;

identify, by the management unit, an updated RTC time value based on the request to update the RTC time value;

send, by the management unit, the updated RTC time value to the logic device via the second bus;

store, by the logic device, the updated RTC time value; and in response to storing the updated RTC time value:
send, by the logic device, an additional interrupt signal to the BMC via the third bus, the additional interrupt signal indicating that the updated RTC time value is stored;

retrieve, by the BMC, the updated RTC time value from the logic device via the third bus; and update, by the BMC, the BMC time value based on the updated RTC time value.

12. The media of claim 11, the software is further operable when executed to:

send, by the management unit, the updated RTC time value to the RTC via the second bus.

13. The media of claim 8, wherein the software is further operable when executed to:

cause the BMC to reboot;

identify, by the BMC, that the management unit is powered off; and retrieve, by the BMC, the RTC time value from the logic device via the third bus.

14. The media of claim 8, wherein the software is further operable when executed to:

identify a time drift associated with the BMC time value, the time drift comprising a difference between the BMC time value and the RTC time value; and cause the BMC to reboot.

15. A computing environment, comprising:

an information handling system including one or more processors; and one or more computer-readable non-transitory storage media coupled to one or more of the processors and comprising instructions operable when executed by one or more of the processors to cause the system to:

identify, by a management unit of a processor subsystem of the information handling system, a real-time clock (RTC) of the information handling system based on an RTC time value stored in the RTC;

receive, by the management unit, a request for the RTC time value from a baseboard management controller (BMC) of the information handling system via a first bus, the first bus communicably coupling the BMC to the management unit;

retrieve, by the management unit, the RTC time value from the RTC via a second bus, the second bus communicably coupling the RTC to the management unit;

send, by the management unit, the RTC time value to a logic device of the information handling system via the second bus, the second bus communicably coupling the logic device to the management unit;

store, by the logic device, the RTC time value; and in response to storing the RTC time value:
send, by the logic device, an interrupt signal to the BMC via a third bus, the interrupt signal indicating that the RTC time value is stored, the third bus communicably coupling the BMC to the logic device;

retrieve, by the BMC, the RTC time value from the logic device via the third bus; and update, by the BMC, a BMC time value based on the RTC time value, the BMC time value stored in the BMC.

16. The computing environment of claim 15, wherein to identify the RTC based on the RTC time value, the processors are further operable when executed to:

access, by the management unit, a memory of the RTC via the second bus, the memory including a plurality of registers, each of the plurality of registers storing a respective portion of the RTC time value;

monitor, by the management unit, a register of the plurality of registers to identify a frequency associated with the respective portion of the RTC time value stored in the register; and determine, by the management unit, an RTC type based on the frequency associated with the respective portion of the RTC time value.

17. The computing environment of claim 16, wherein to monitor the register of the plurality of registers to identify the frequency associated with the respective portion of the RTC time value, the processors are further operable when executed to:

identify, by the management unit, a first value of the respective portion of the RTC time value stored in the register;

wait, by the management unit, a predetermined period of time;

identify, by the management unit, a second value of the respective portion of the RTC time value stored in the register; and determine, by the management unit, a difference between the first value of the respective portion and the second value of the respective portion.

18. The computing environment of claim 15, wherein the processors are further operable when executed to:

receive, by the management unit, a request to update the RTC time value from a host service of the information handling system, the request based on a change event associated with the information handling system;

identify, by the management unit, an updated RTC time value based on the request to update the RTC time value;

send, by the management unit, the updated RTC time value to the logic device via the second bus;

store, by the logic device, the updated RTC time value; and in response to storing the updated RTC time value:

send, by the logic device, an additional interrupt signal to the BMC via the third bus, the additional interrupt signal indicating that the updated RTC time value is stored;

retrieve, by the BMC, the updated RTC time value from the logic device via the third bus; and update, by the BMC, the BMC time value based on the updated RTC time value.

19. The computing environment of claim 18, wherein the processors are further operable when executed to:

send, by the management unit, the updated RTC time value to the RTC via the second bus.

20. The computing environment of claim 15, wherein the processors are further operable when executed to:

cause the BMC to reboot;

identify, by the BMC, that the management unit is powered off; and retrieve, by the BMC, the RTC time value from the logic device via the third bus.

* * * * *